United States Patent [19]

Schilling

[11] Patent Number: 4,470,268

[45] Date of Patent: Sep. 11, 1984

[54] ABSORPTION REFRIGERATION APPARATUS AND PROCESS FOR ITS OPERATION, AND APPLICATION OF THE ABSORPTION REFRIGERATION APPARATUS

[75] Inventor: Siegfried Schilling, Volketswil, Switzerland

[73] Assignee: Oertli AG Dubendorf, Dubendorf, Switzerland

[21] Appl. No.: 279,986

[22] PCT Filed: Oct. 24, 1980

[86] PCT No.: PCT/CH80/00127

§ 371 Date: Jun. 22, 1981

§ 102(e) Date: Jun. 22, 1981

[87] PCT Pub. No.: WO81/01193

PCT Pub. Date: Apr. 30, 1981

[30] Foreign Application Priority Data

Oct. 25, 1979 [CH] Switzerland ............... 9570/79
Oct. 2, 1980 [CH] Switzerland ............... 7383/80

[51] Int. Cl.³ .............................................. F25B 27/00
[52] U.S. Cl. ................................................. 62/235.1
[58] Field of Search ..................................... 62/255.1

[56] References Cited

U.S. PATENT DOCUMENTS 4,165,952  8/1979  Bennett .................. 62/235.1 X

Primary Examiner—Lloyd L. King
Attorney, Agent, or Firm—James E. Nilles

[57] ABSTRACT

A heat exchanger container (2) having a round or square cross-section is divided longitudinally into a boiler compartment (4) and an absorber compartment (5) by a hygroscopic partition wall (1) provided with surfaces (11) on the boiler side, respectively (12) on the absorber side. At both ends of the partition wall (1) are provided sealing elements (10) which insulate the partition wall from the container (2). Cooling vanes (3) increase the active outer surface of the container (2). A condenser (6) for liquifying the refrigerant is located after the container (2) in the flow direction. Then comes a choke member (8) intended to choke control the refrigerant. Finally there is provided an evaporator (7) of which the outlet is connected to the absorber compartment (5) of the container (2). Pipes connect the container (2) on one hand to the condenser (6) and on the other hand to the evaporator (7). This sorption refrigerating apparatus may be set in operation continuously.

12 Claims, 27 Drawing Figures

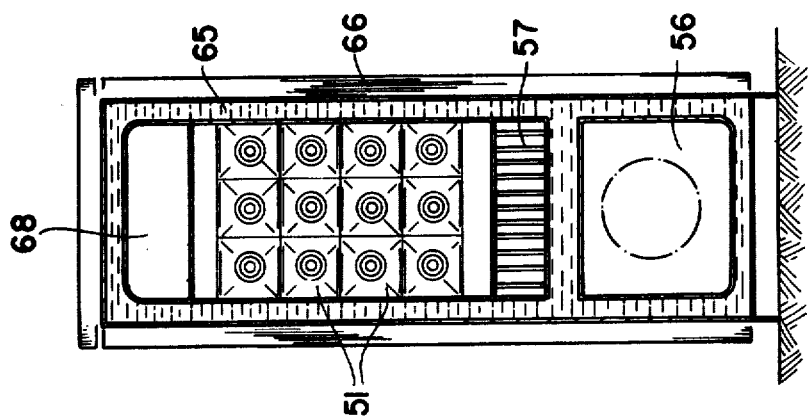
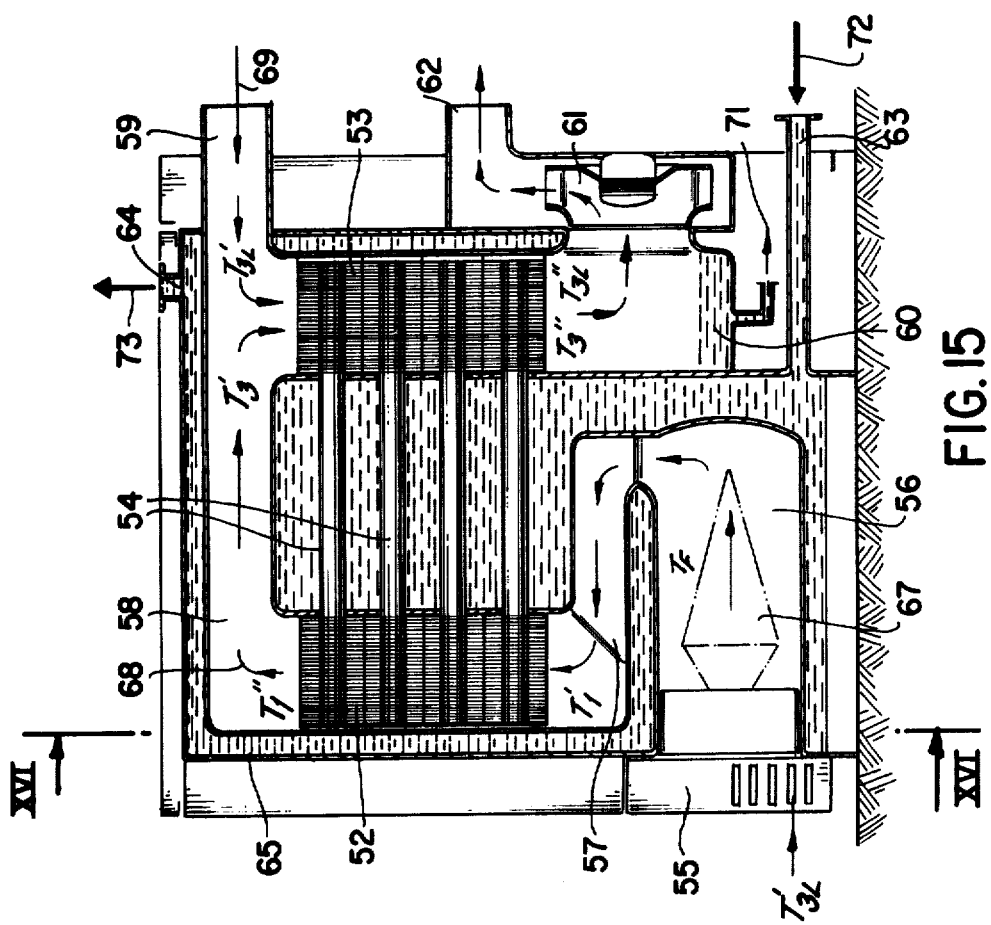

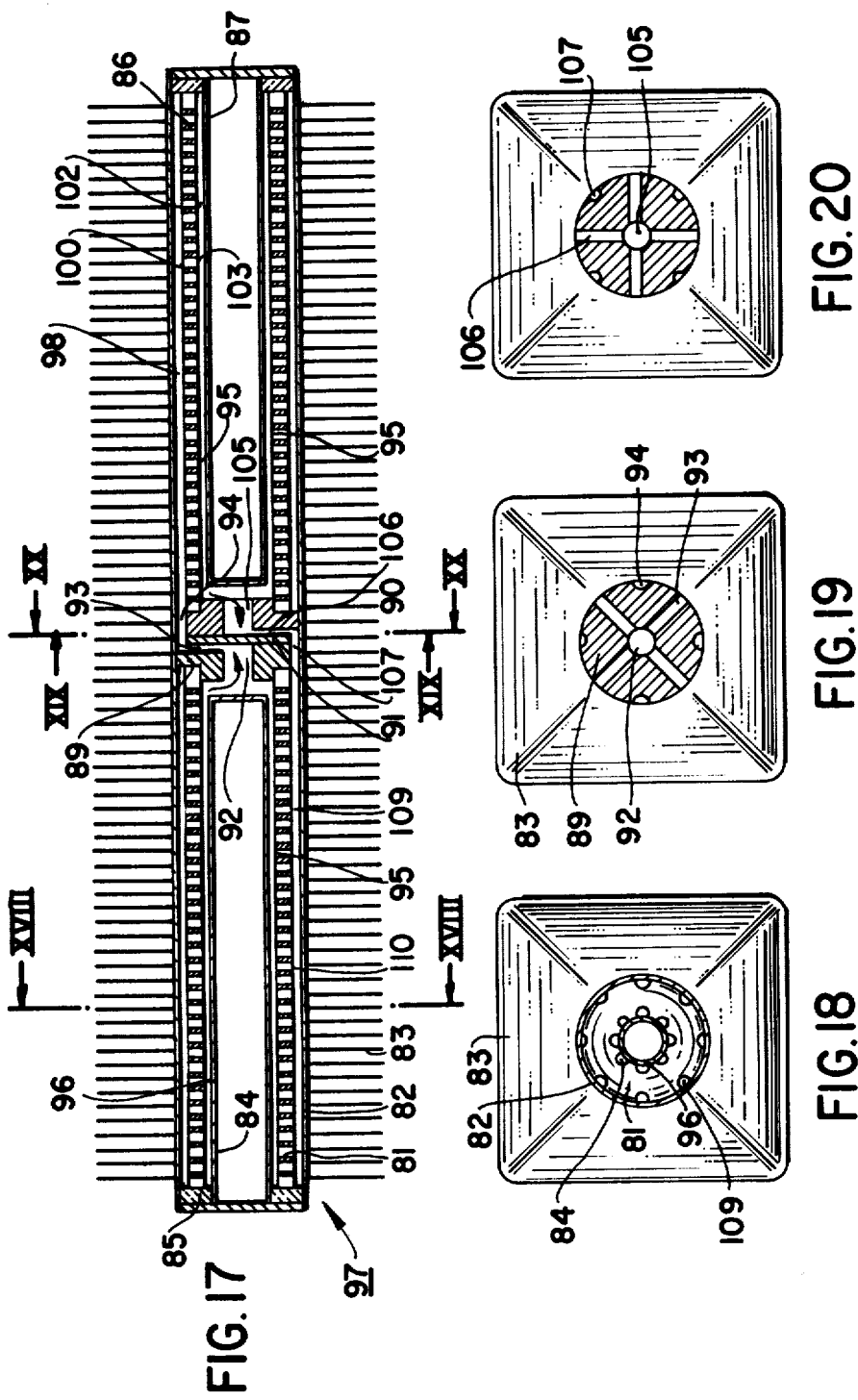

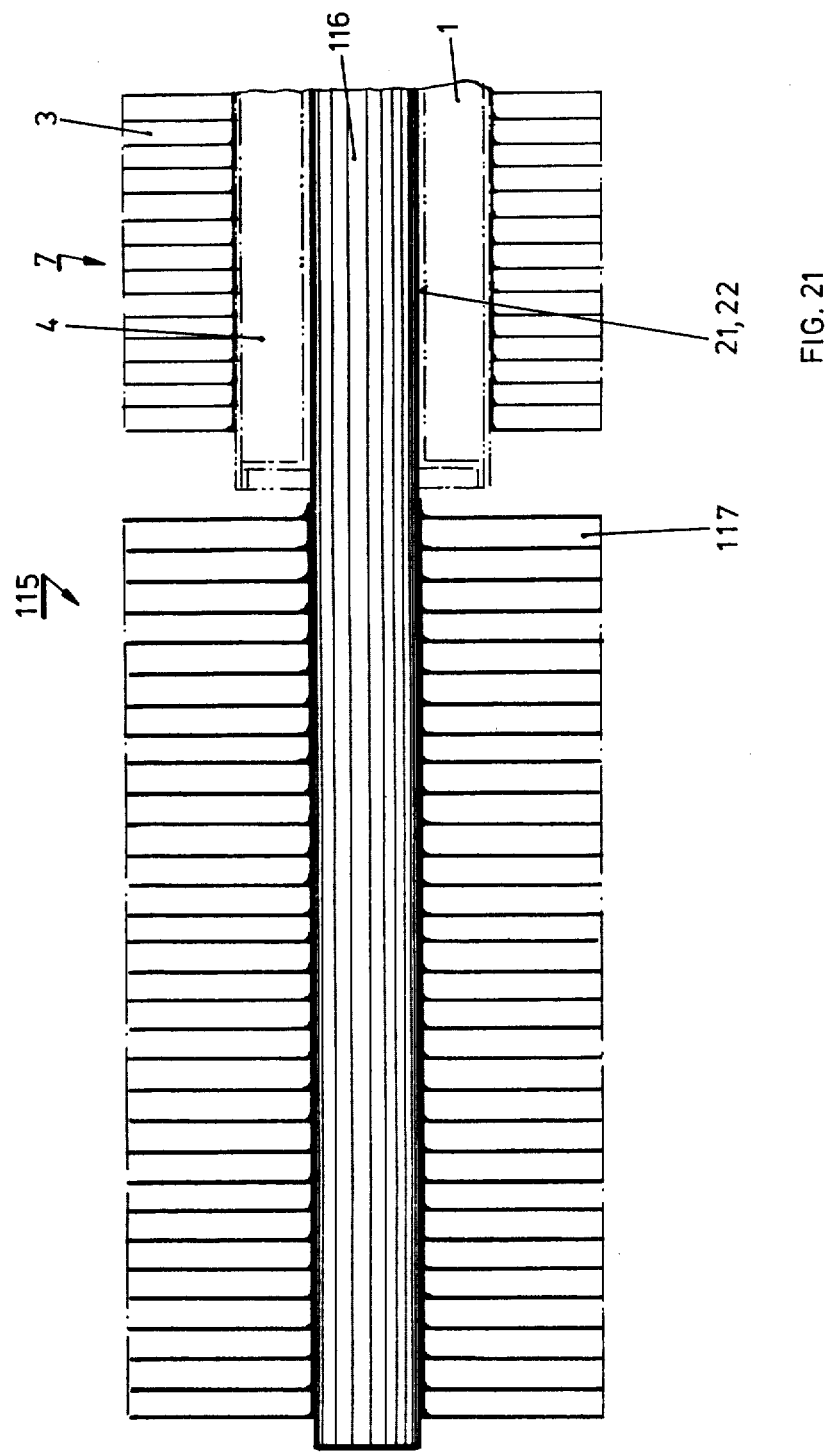

ABSORPTION REFRIGERATION APPARATUS AND PROCESS FOR ITS OPERATION, AND APPLICATION OF THE ABSORPTION REFRIGERATION APPARATUS

The invention relates to a continuously operable absorption refrigeration apparatus with an ejector, condenser, throttling element, evaporator and absorber or resorber, and also to a method of operating it and application of the absorption cooling apparatus.

STATE OF THE ART

Absorption refrigeration machines, in their numerous embodiments, have been known and technically developed for a long time, both for industrial installations and as household devices (see Rudolf Plank, "Handbuch der Kaltetechnik"[Handbook of Refrigeration Technology], Volume VII, and "Die Kaltemaschine"[Refrigeration Machines] by R. Plank and J. Kuprianoff).

In the earliest times, work was done on the development of absorption refrigeration machines for their employment as heat pumps, as is shown for example by the published new developments of the DFVLR (Deutsche Forschungs- und Versuchsanstalt fur Luft- und Raumfahrt [German Research and Experimental Institute for Air and Space Travel])—see "Oel- und Gasfeurung" [Oil and Gas Combustion], Vol. 12/1978.

This is concerned with a classic absorption refrigeration machine with fluid material pairs wherein the ejector (boiler) is fired directly from a gas or oil burner and the residual heat of the exhaust as well as the heat of the environment is conducted to the evaporator as secondary energy and is thus made useful.

Later, periodically operating absorption refrigeration machines became known, with solid absorption media, as for example iron chloride or calcium chloride and ammoniac or methylamin as absorbers, which could also be operated in a heat pump circuit.

In the technical realization of the described heat pump systems, difficulties arose in practice which among other things were caused, for example, by the high cost of the apparatus and its complicated manufacture, as well as due to the characteristics of the material systems, such as poor heat conductivity, unfavorable vapor pressure values, bulky sources and the source pressures connected therewith.

A further crucial disadvantage is the unfavorable suitability for volume fabrication of load units of kilowatt values.

Thus, for the elimination of these disadvantages, promising elements for heat storage were proposed, which operated according to the principle of the absorption refrigeration machine (Swiss Pat. No. 609,140). This is concerned with storage elements for an absorption heat storage system which comprises a solid material as an absorption medium and an accumulator for the absorbate driven out of the absorption medium. The absorption medium and the accumulator are arranged in a closed pipe-like housing and are separated from one another by an intermediate space.

Elements of this type have the advantage that they are well suited to rational quantity production as small production units that can be assembled according to need into larger capacity units. Storage elements of this type, connected and operated as absorption heat pumps, have the disadvantage that they allow only a discontinuous mode of operation.

DESCRIPTION OF THE INVENTION

The present invention has as its object to provide a continuously operable absorption refrigeration apparatus which does not have the described disadvantage of a discontinuous mode of operation and provides a refrigeration device of the most simple possible construction with all the advantages of a static refrigeration machine.

According to the invention, this objective is attained in that the ejector chamber is separated from the absorber or resorber chamber by a hygroscopic partition wall.

By "hygroscopic" is meant all of those materials and material systems which effect absorption of an organic or inorganic absorbate, wherein the vapor pressure of the material or material system noticeably departs from the saturation vapor pressure of the absorbate. (See in this connection O. Krischer, Trocknungstechnik [Drying Technique] 1978, page 54).

BRIEF DESCRIPTION OF THE DRAWINGS

The absorption refrigeration apparatus according to the invention and its employment are explained by way of example by reference to the drawings, wherein:

FIGS. 15 and 16 are a longitudinal section through a heating vessel with installation of an absorption heat pump module in longitudinal section and according to section line XVI—XVI of FIG. 15;

FIGS. 17, 18, 19, 20 are a longitudinal section through a schematically illustrated reabsorption heat pump module with cross-sections according to section lines XVIII—XVIII, XIX—XIX and XX—XX of FIG. 17;

FIG. 21 is a view of an insertable heat duct for transferring the ejector heat or the evaporator heat;

DESCRIPTION OF THE INDIVIDUAL FIGURES

Figure 1:
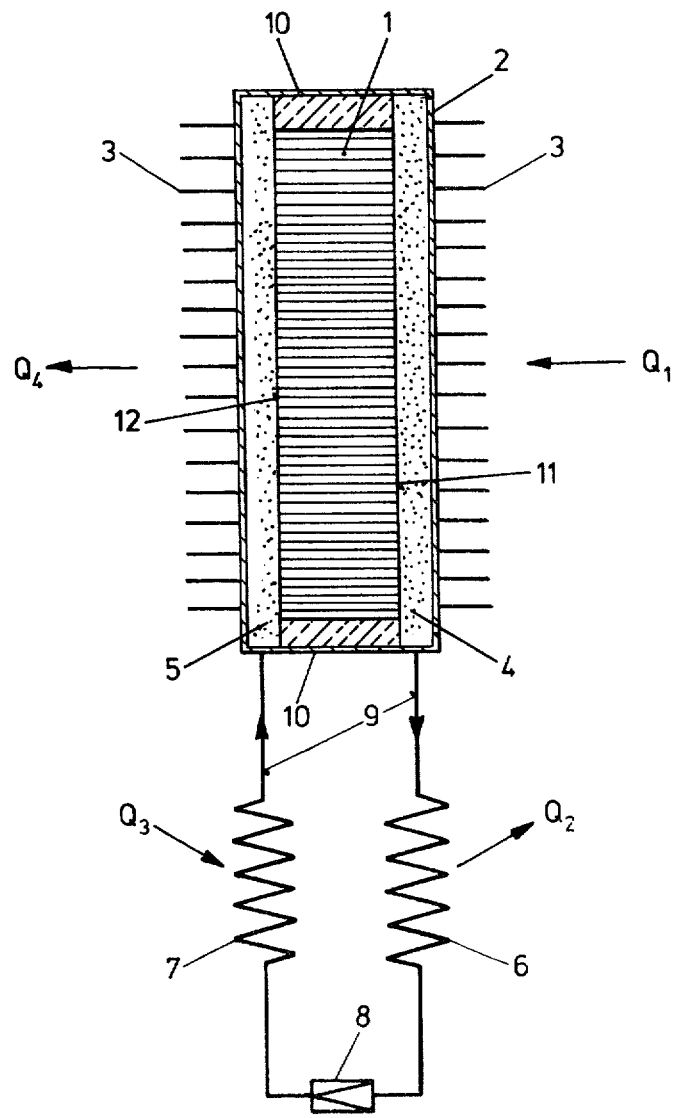
FIG. 1 is a purely schematic illustration of an absorption heat pump module with the ejector/absorber receptacle in longitudinal section.

A heat exchanger receptacle 2, of round or rectangular cross-section, is divided lengthwise into an ejector chamber 4 and an absorber chamber 5 by a hygroscopic partition wall 1 which has surfaces 11 on the ejector side and 12 on the absorber side. On both ends of the partition wall 1 there are sealing elements 10 which seal off the partition wall 1 from the receptacle 2. Ribs 3 are provided for enlarging the effective external surface of the receptacle 2. As FIG. 1 shows, a condenser 6 for liquifying the cooling medium is connected in the flow from the receptacle 2. This is followed by a restrictor in the form of a throttling instrumentality 8, which serves for throttling the cooling medium, that is to say, for relieving it. Finally, there follows an evaporator 7, the outlet of which is led back to the absorber chamber 5 of the receptacle 2. Ducts 9 connect the receptacle 2 on one side with the condenser 6 and on the other side with the evaporator 7. An absorption heat pump of this type functions as follows:

By conduction of heat $Q_1$ through the wall of the receptacle 2 with its ribs 3, the surface 11 of the partition wall 1, which is damp in and of itself, is heated, and thereby cooling medium is evaporated that is in the moisture-generating fluid in the partition wall 1. On the ejector side, the so-called high pressure portion, the pressure rises in the ejector chamber 4 with increasing cooling medium evaporation. As a result of this, the cooling medium, by way of the duct 9, arrives in the condenser 6, in which a heat abstraction $Q_2$ takes place. In consequence, the cooling medium liquifies there and is cooled to a temperature that lies below its boiling point. Across the throttling element 8 the condensate, which is under substantial pressure, is relieved. It arrives as a liquid in the evaporator 7, where, under heat delivery $Q_3$, it is completely evaporated (saturated vapor, slightly over-heated). This cold vapor then flows through the duct 9 into the absorber chamber 5, where it is absorbed by the moist hygroscopic partition wall 1, on its surface 12. In this, the released absorption heat $Q_4$ must be conducted away. Predominantly this is the heat of vaporization of the cooling medium. Now the cooling medium arrives at the opposite surface 11 of the partition wall 1, from the surface 12, through the capillary system that is formed by the partition wall 1. In this the driving force for cooling medium transport is applied by the capillary attraction of the meniscuses that are formed on the ejector side of the hygroscopic partition wall 1.

The processes on and in the porous and hygroscopic partition wall are of decisive significance for the total operation of the absorption heat pump module according to the invention. The term "module" is to be herein understood as meaning a normalized structural entity. The partition wall 1 forms, together with the receptacle 2, the so-called thermal drive of this refrigeration machine. The vapor pressure of the absorbate (cooling medium) over the surface 11 is greater than that over the surface 12. From this there results a working pressure difference between the ejector chamber 4 and the absorption chamber 5, in an operation without auxiliary gas (without pressure equalization). The operation of the connection between the two chambers 4 and 5 is determined by capillary force in consequence of the capillary tube construction of the partition wall 1. The design and dimensioning of the capillary tubes (capillary diameter and length) consequently comes to have a decisive significance for the functioning in the explained sense.

Figure 2:
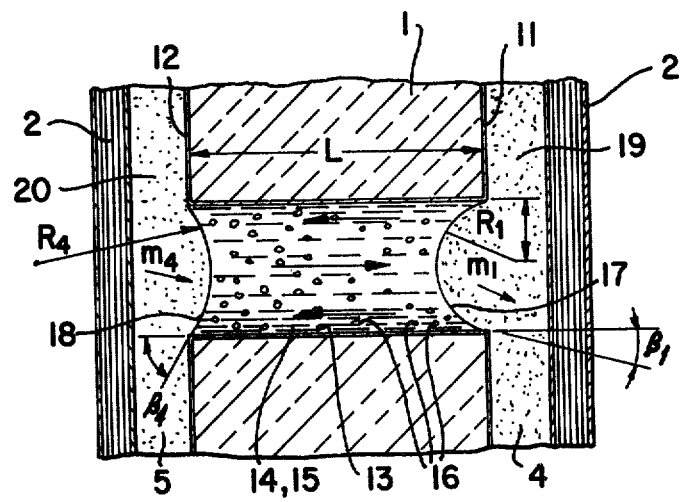
FIG. 2 is a section through the partition wall that separates the ejector chamber from the absorber chamber, with the illustration of a capillary tube.

In FIG. 2 there is illustrated an enlargement of an idealized pore or capillary tube 11 of the partition wall 1. In the pore 13 there is a capillary fluid 14, with its components 15 and 16, which furnishes a three-fold function, namely that of a vapor barrier (barrier liquid), that of cooling medium transport and also that of vapor pressure reduction. On the porous wall, wetting takes place, which leads to the formation of the meniscuses 17 and 18.

According to O. Hummel, the boundary angle $\beta_2$ and $\beta_4$ for the degree of development of the meniscuses, with a pore radius r and the curvature radii $R_1$ and $R_4$, can be written.

$$\cos \beta_1 = \frac{r}{R_1}$$

$$\cos \beta_4 = \frac{r}{R_4}$$

During heat delivery $Q_1$ the solution medium 19 or cooling medium vapor $\dot{m}_1$ flows away from the surface of the meniscus 17, in contrast to which the surface of the meniscus 18 takes up the cooling medium vapor 20 or $\dot{m}_4$ by absorption. With equilibrium:

$$\dot{m}_1 = \dot{m}_4$$

Through the inflow and outflow of solution medium to the meniscuses they are markedly strongly curved. There originates accordingly an equalizing flow in the direction of the meniscus with the greater curvature or the greater attraction, hence in the direction of the surface 11. This attraction is in equilibrium with the external forces such as pressure and friction.

For the capillary pressure there can be written $$P_{k1} = \frac{2\sigma \cos \beta_1}{r} \text{ for meniscus 17}$$

$$P_{k4} = \frac{2\sigma \cos \beta_4}{r} \text{ for meniscus 18.}$$

The pressure difference is then:

$$\Delta P_k = \frac{2\sigma}{r} (\cos \beta_1 - \cos \beta_4).$$

If the maximum capillary force of the meniscus 17 is in equilibrium with the sum of all the external forces, then this is fully balanced, and then $$R_1 = r$$

and with $m_1 = m_4$, $R_4 = \infty$. Therefore, the maximum capillary force can be written:

$$P_k = \frac{2\sigma}{r}$$

With the employment of a LiBr solution as the capillary liquid and $H_2O$ as the cooling medium, and the liquification temperature $T_2 = 30°$ C. and also the vaporization temperature $T_3 = 10°$ C., the capillary tubes must hold an opposing pressure of 3126 pa (1 pa$\cong$1 $N/m^2 = -^5$ bar). A capillary tube with a radius of $r = 10^{-5}$m and a surface tension of the capillary fluid of $\delta = 0.073$ $Nm^{-1}$ can create a maximum opposing pressure of $P_k = 14500$ pa.

With the Hagen-Poiseull law, by setting the pressures equal and solving for the mass flow for the capillary fluid movement, $$\dot{m} = \frac{r^4 \pi \cdot [\Delta p_k - (p_4 - p_1)]}{8 \cdot v \cdot L} \left[\frac{kg}{S \cdot Pore}\right].$$

This approach leads to relatively large mass flows.

Since the return flow of the dissolved components, e.g. LiBr, from the surface 11 to the surface 12 is accomplished by diffusion, the mass transport is controlled by diffusion notwithstanding the large capillary fluid movement.

For estimating the order of magnitude of this mass flow, there can be written, with Fick's first law:

$$\dot{m} = \sigma \cdot D \frac{(\xi_1 - \xi_4)}{L} \left[\frac{kg}{m^2 s}\right].$$

Then with:

$\xi_1 = 0.55$—concentration on surface 12,
$\xi_4 = 0.35$—concentration on surface 11,
$L = 0.005$ m—thickness of the partition wall, $$\sigma = 0.1700 \frac{kg}{m^3} - \text{density of the solution,}$$

$$D = 2.88 \times 10^{-} \frac{m^2}{s} - \text{diffusion constant,}$$

$$\dot{m} = 1.958 \times 10^{-4} \frac{kg}{m^2 s}$$

For an assumed cooling load of $Q_3 = 0.1$ kW, there is needed, for example, a mass flow of the cooling medium $H_2O$ of $$\dot{m} = \frac{Q_3}{\eta} = 4.04 \times 10^{-5} \frac{kg}{s}.$$

With this mass flow and the mass flow density due to diffusion, the needed passage surface is $A = 0.206$ $m^2$.

This surface magnitude is controllable by construction, for example by laminated construction.

According to Dalton or Raoult's law, with dynamic equilibrium the vapor pressure of the dissolved cooling medium upon the surfaces 11 and 12 is lower than that of the pure absorbate (partial pressure of the solution components). The vapor pressures are known to be given by the corresponding solution concentrations (here, on the two surfaces 11 and 12) and the prevailing temperatures, in connection with which the moistures are generated out of solutions with two or more components of different concentrations. Thus, by way of example, an aqueous lithium bromide solution with 35% by weight $H_2O$ is present on the surface 11 at the ejector chamber 4 and a relatively thinned lithium bromide solution with 55% by weight of water is on the surface 12 at the absorber chamber 5. In this it is to be kept in mind that the water is, in this case, not only just the solvent medium but at the same time also the cooling medium. The concentration decline of the cooling medium water from the absorber chamber 5 to the ejector chamber 4 is produced on the surface 11 by driving out, and on the surface 12 by absorption, of the absorbate (water). In the partition wall 1 a transport system for solvent medium is maintained by capillary liquid movement, by circulation due to density differences as well as by diffusion in its most varied manifestations.

In the ejector chamber 4, as also in the absorption chamber 5, the vapor pressures and the corresponding saturated vapor temperatures are co-determined by the working material pair and the material structure of the partition wall 1.

In the pertinent literature (for example, Rudolf Plank, Sorptions-Kaltenmaschinen [Absorption Refrigeration Machines] there is given a list of material pairs with their thermodynamic data: lithium chloride + $H_2O$ (LiCl + $H_2O$), sodium hydroxide liquor + $H_2O$ (NaOH + $H_2O$), potash liquor + $H_2O$ (KOH + $H_2O$), calcium chloride + $H_2O$ ($CaCl_2$ + $H_2O$), lithium chloride + methanol (LiCl + $CH_3OH$) (methanol as the cooling medium), LiBr + $CH_3OH$, mineral oil + F-21 (Frigen) (classical cooling medium).

Through the mentioned ejector process, maintained by the heat conduction $Q_1$, the surface 11 at the ejector side is in the first place deficient in cooling medium and, depending upon the materials pair, consequently richer in solvent medium or dissolved material which the capillary liquid presents. In contrast thereto, although new cooling medium always arrives in the absorption chamber 5 and hence upon the surface 12 at the absorber side, the concentration of the there-present solution is richer in cooling medium (more water) and consequently that of the dissolved material—in the present case lithium-bromide solution—is poorer. This concentration decrease in cooling medium in the pore solution, from chamber 5 to chamber 4, aims at an equal mass balance according to the laws of diffusion, in which the capillary fluid movement, called into being by the capillary force, opposes a diffusion flow of the absorbates. Naturally diffusion flows are substantially slower than flow processes in capillary tubes. Since a weak concentration of cooling medium or solution medium is nevertheless needed for maintenance of the described absorption process on the absorber side, the surface of the capillary system involved in the exchange through the pores 13 is enlarged by a multiple, in the sense of the present invention, by laminated construction or a tufted type surface.

Figures 3, 4:
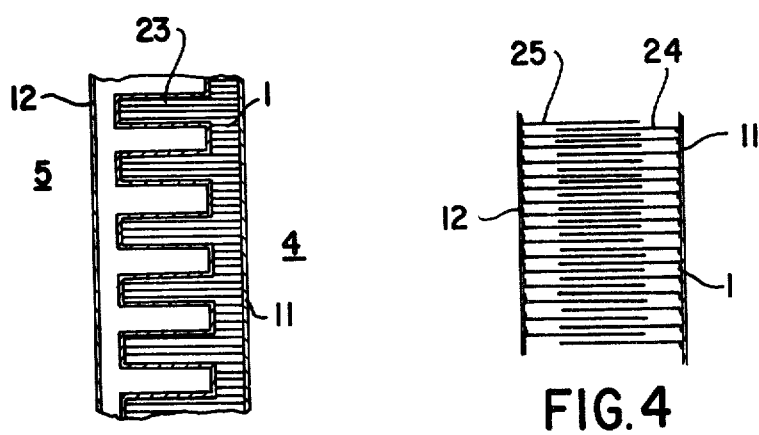
FIGS. 3 and 4 are two embodiments of hygroscopic partition walls in an absorption heat pump module, in schematic illustration, in longitudinal section.

A construction of this type is shown in FIG. 3, in which, sectionally and greatly enlarged, there is visible a portion of the hygroscopic partition wall 1 with both of its surfaces 11 and 12 at the ejector chamber 4 and the absorber chamber 5. The partition wall 1 is provided with inter-engaged tufts 23, to enlarge the exchange surfaces. As is known to those skilled in the art, it is not only the concentration decrease which effects a diffusion movement but also, even if in the lesser measure, the temperature decrease, which calls into being the so-called thermal diffusion. It is further known that most capillary structures, in connection with aqueous solutions, have a selective absorptive strength for certain components. For example, the water of an aqueous lithium bromide solution is preferentially taken up by filter paper. In this the concentration decreases with the level of absorption, a phenomenon that finds employment in chromatographic separating methods.

FIG. 4 shows a variant of FIG. 3. Here, for the purpose of better heat delivery and heat removal, the partition wall is provided with heat conducting fins 24 and 25, which transversely penetrate the partition wall 1 on both sides and which are fastened onto the corresponding sealing walls that form the surfaces 11 and 12.

An accelerated concentration equilibrium is obtained with a two-sheet capillary system, in which a solution circulation between the two capillary sheets takes place due to density difference. With this accelerated equilibrium there is, to be sure, the disadvantage that heat transport from the ejector side to the absorber side is strengthened, which causes a correspondingly greater heat loss and thereby worsens the heat relationship ($Q_3/Q_1$). However, by the building in of baffle plates with anisotropic heat conducting characteristics, the heat of the rich solution, directed by heat conduction, could be transmitted to the poor solution. This thought can be seen in the embodiment according to FIG. 5. This figure shows the character of a hygroscopic partition wall as it is shown, by way of example, designated by 1 in FIG. 1. The partition wall 30 seen in FIG. 5 again separates the ejector chamber 4 from the absorption chamber 5. The upper and lower closures are each effected by a seal element 10. Instead of the homogeneous construction of the hygroscopic partition wall illustrated in FIG. 1, this separating wall 30 has a centrally arranged baffle sheet 32. This is, as illustrated, isolated into parts by means of an insulation 31. Around this nucleous 31, 32, the solution 33 that is rich in water moves in circular motion towards the solution 34 that is poor in water. In this manner this internal flow is brought into being, particularly due to density differences ($\rho_1/4 = 1.4$). The baffle sheet 32, consisting of metal, has a high heat transfer coefficient $\lambda$. As a result, with the latter arrangement the heat conduction transversely to the stream flow path is substantially smaller than the heat conduction along the flow direction from the rich solution to the poor one, since this is directly given by the metallic conduction of the baffle plate 32.

Figure 25:
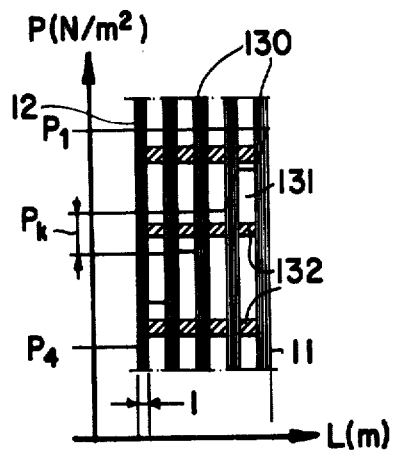
FIG. 25 is a five-sheet partition wall system, in section.

Substantial advantages are obtained with a partition wall system according to FIG. 25.

The partition wall (designated by 1 in FIG. 2) here consists of five (there should be two or more) sheets 130 that are arranged at distances from one another, for which integral distance spacers 132 are arranged in the intermediate chambers 131.

The material of the distance 132 is not wettable, or is only slightly wettable, by the capillary fluid 14 as well as by the liquid cooling medium 15. Through this a transport of moisture in the absorbed phase to the surface of the distance spacer 132 is prevented, and thereby a concentration polarization of the dissolved components 16 upon the surface 11 with excessive hydrodynamic capillary fluid transport, released by the described capillary force, is substantially reduced.

The necessary cooling medium transport is accomplished within the sheets 130, as already described. From sheet 130 to sheet 130 it is however accomplished by change of phase: evaporation-condensation, with the corresponding pressures which at any given time prevail in the intermediate chamber 131.

The heat of vaporization is predominantly conducted by heat gransfer to the corresponding surfaces, by way of the distance spacer 132, against the vapor mass flow.

The solution concentration $\xi$ in the pores of the individual partition walls differ in correspondence with the prevailing wall temperatures and pressures.

With the described partition wall system it is possible to increase the total working pressure difference ($P_1-P_4$) between the ejector chamber 4 and the absorber chamber 5 (FIG. 1) in accordance with the number of sheets to the corresponding multiple of the individual capillary pressures, since on each sheet meniscuses form in the pores against the vapor of the cooling medium.

Figure 26:
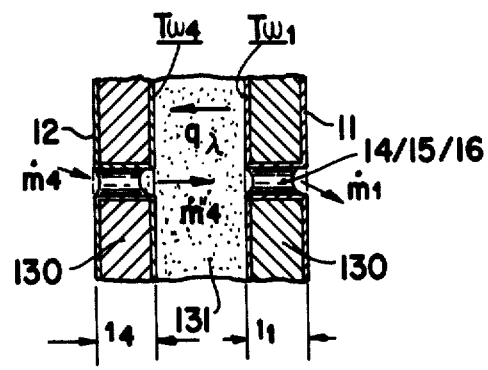
FIG. 26 is a partial section through a two-sheet partition wall system.

FIG. 26 shows a partial section of a two-sheet system. Herein the significations are:

q$\lambda$—the heat flow density (W/m$^2$s)
m—the mass flow density (Kg/m$^2$s)
Tw—the wall temperature (°C.)

In FIG. 25 is plotted the pressure curve of a five sheet system relative to the total pressure L, wherein $P_k$ signifies the individual capillary pressures.

Figure 27:
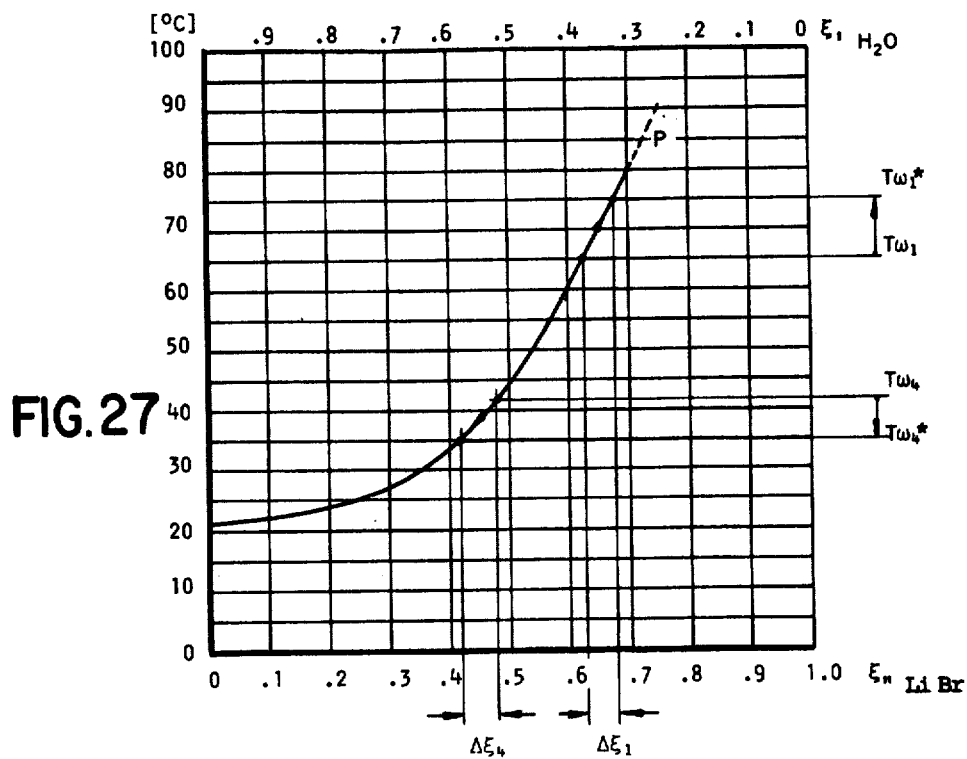
FIG. 27 is a ξT diagram with isobars for H₂O-LiBr.

FIG. 27 is a $\xi$T-diagram for the capillary fluid LiBr-H$_2$O with an isobar of the saturation pressure P of H$_2$O.

In this diagram there are plotted the equilibrium concentrations and also the equilibrium temperatures $Tw_1$ and $Tw_4$ for two sheets.

In the ejection process on the surface 11 the concentration naturally changes about the value $\Delta\xi_1$; the solution concentration on the surface 12 changes about the like value $\Delta\xi_4$ with absorption. The two concentration changes develop oppositely and release on the ejector side a supercooling of the value ($Tw_1^*-Tw_1$) and on the absorption side a superheating of the value ($Tw_4-Tw_4^*$).

Figures 5, 6:
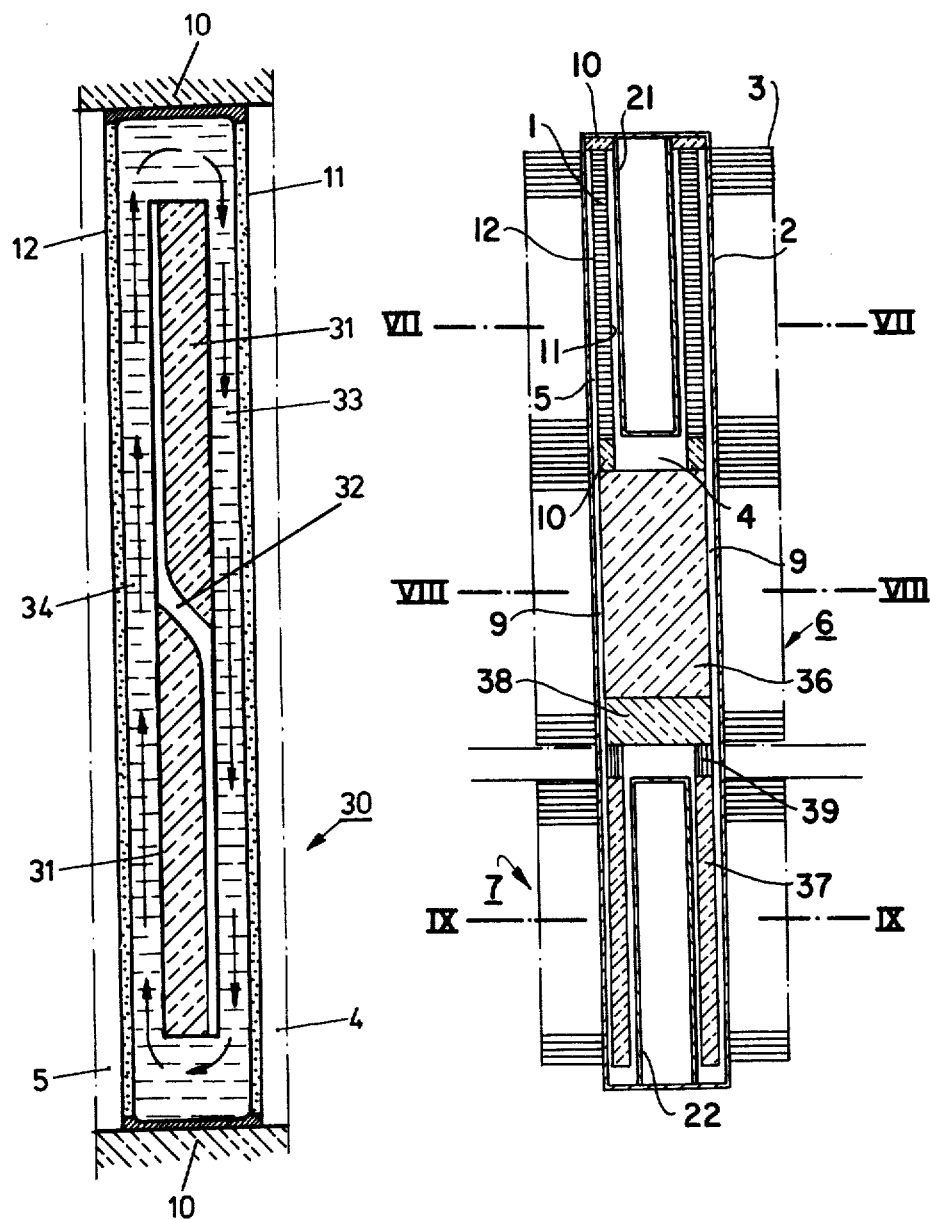
FIG. 5 is a special form of hygroscopic partition wall in longitudinal section.
FIG. 6 is a longitudinal section through a schematically illustrated embodiment of the method of construction of an absorption heat pump module.

Tw* are the apparent or the new equilibrium temperatures. Through this process-determined deviation from the equilibrium condition there is accomplished a vapor mass flow in the desired direction to the ejector surface 11. In FIG. 6 is illustrated in longitudinal section a schematic total picture of an absorption heat pump module according to the invention. It is concerned basically with the embodiment schematically illustrated in FIG. 1 which here in FIG. 6 has more practical details. Thus, the hygroscopic partition wall 1 is seen that divides the receptacle 2 into two separate chambers or spaces, the ejector chamber 4 and the absorber chamber 5. There is further illustrated the manner in which the condenser 6 is connected with the receptacle 2 and also with the evaporator 7 that is connected behind it, wherein there is also seen, between the condenser 6 and the evaporator 7, the throttling element that is also illustrated in FIG. 1, formed as a throttle body 38.

The receptacle 2, which must naturally be gas tight, is preferably cylindrical, with circular or oval cross-section. It can also be basically formed plate-like or rectangular. The housing 2 is provided with ribs or fins 3 in order to enlarge the heat exchange surfaces. This attachment of ribs or fins 3 is of particular necessity when the heat of condensation, of absorption and of vaporization is to be conducted to it or away from it by means of a gas, for example air.

With heat exchange between liquid media, these fins or ribs 3 can be omitted. As illustrated in FIG. 6, the hygroscopic partition wall 1 has an inner trough-like depression formed therein, into which extends a wall 21 that is a continuation of the container wall. The evaporator 7 has a similar wall 22. These walls 21, 22 serve in particular for conducting the heating medium to the ejector portion or for conduction of the medium in the evaporator portion.

The condenser 6 consists essentially of a filling of coarse-pored filling material with good heat conducting ability, for example porous silicon nitride. The insertion of these materials produces the advantage that they operate well in themselves and also have a high corrosion resistance against aggressive media. This filling 36, like the porous partition wall 1, has contact with the receptacle wall of the receptacle 2.

Figure 7:
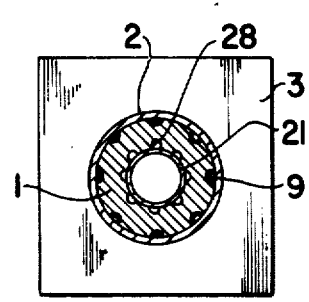
FIGS. 7, 8 and 9 are sections on the section lines VII—VII, VIII—VIII and IX—IX of FIG. 6.
Figure 8:
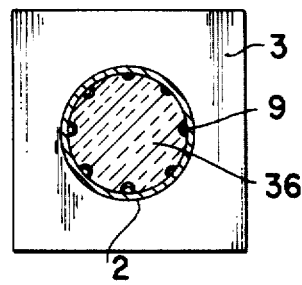
Figure 9:
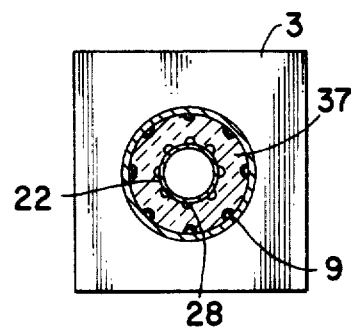

FIGS. 7-9, corresponding to sections VII—VII, VIII—VIII and IX—IX of FIG. 6, show the type of contact of the above mentioned portions as well as their interruption by the longitudinal passages 9 or 28. The longitudinal passages 9 and 28 serve for transport of cooling medium from the ejector chamber 4 by way of the condenser 6 and the evaporator 7 to the absorber chamber 5, as is shown by the arrows in FIG. 10.

The evaporator 7 likewise has a filling 37 of porous material. This filling serves to take up the liquid cooling medium. This material, for example silicon nitride, also has a good heat conduction capability.

In order to forestall as much as possible an axial heat flow from the condenser 6 to the evaporator 7, there is, between the fillings 36 and 37, a porous body 39 with poor heat conduction characteristics, that is, a heat insulating body, for example paper, wood, ceramic laminations or the like, which are provided in such a manner that a liquid transport takes place in it due to the capillary force.

The cooling medium relief in passage from the high pressure portion to the low pressure portion, that is, from the ejector chamber 4 to the absorber chamber 5 of the heat pump module, is accomplished by means of the throttle body 38.

Figure 10:
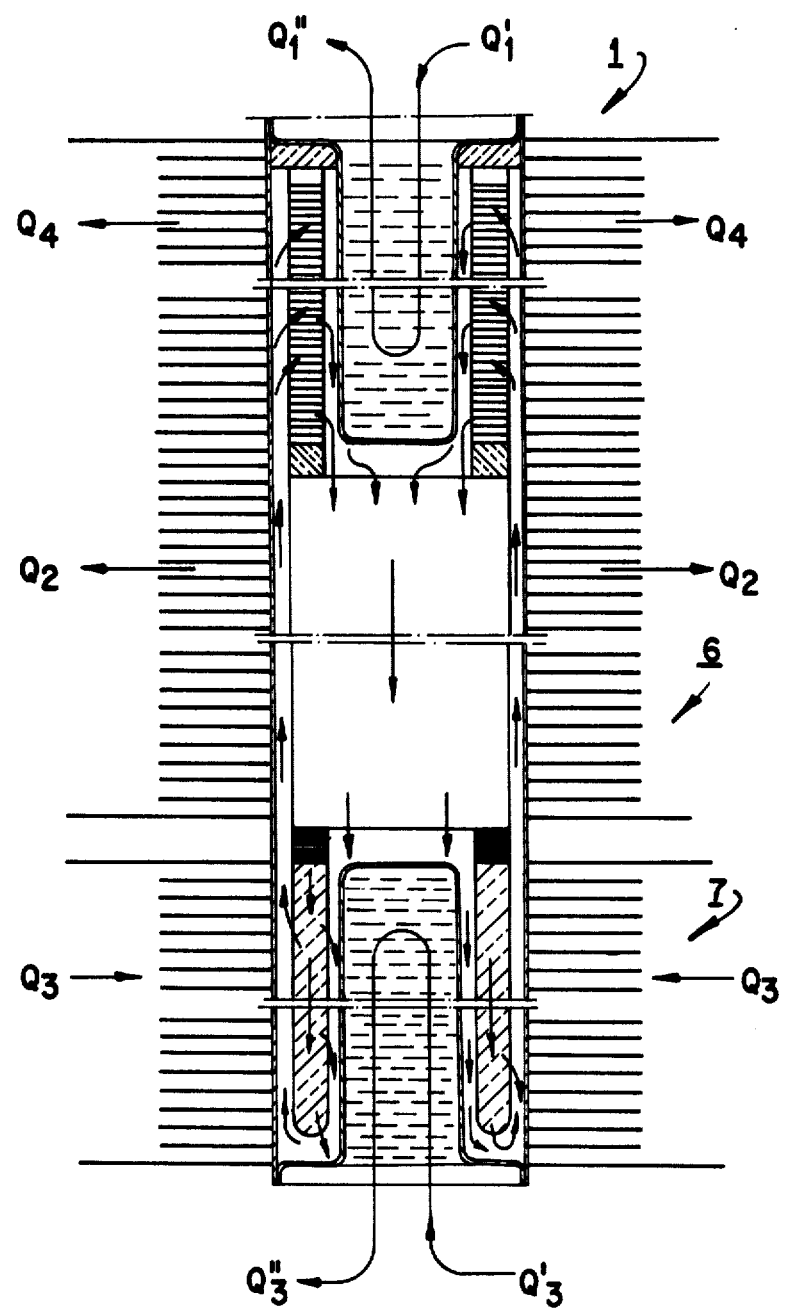
FIG. 10 is a simplified illustration of FIG. 6 with the indication of heat movements in the module.

FIG. 10, a simplified illustration of FIG. 6, shows the heat quantities $Q_x$ conducted to and from the system, as also the flow paths of the cooling medium, designated by arrows.

Figure 11:
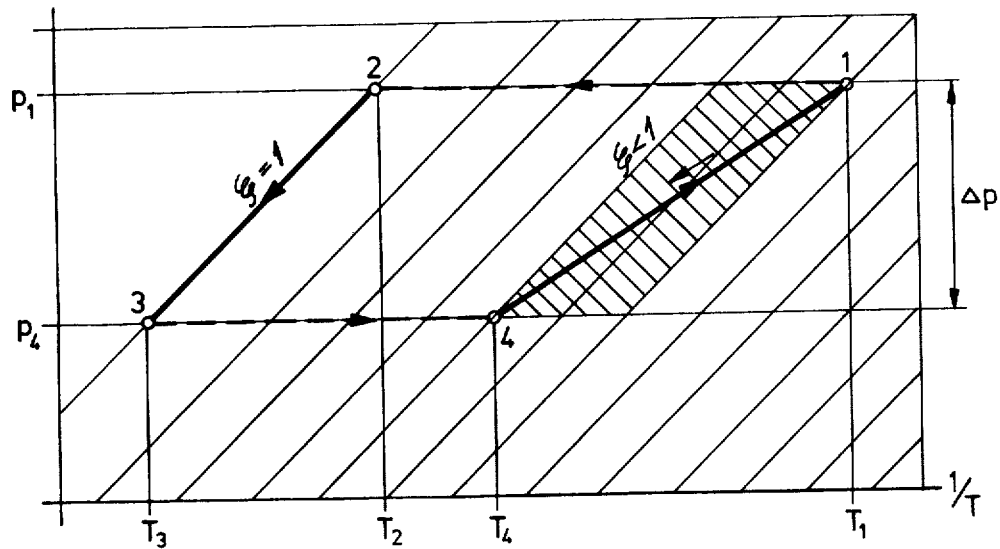
FIG. 11 is a graph with system pressure illustrated in the diagram in dependence upon the absolute temperature in logarithmic scale and the proportion $1/T$.
Figure 12:
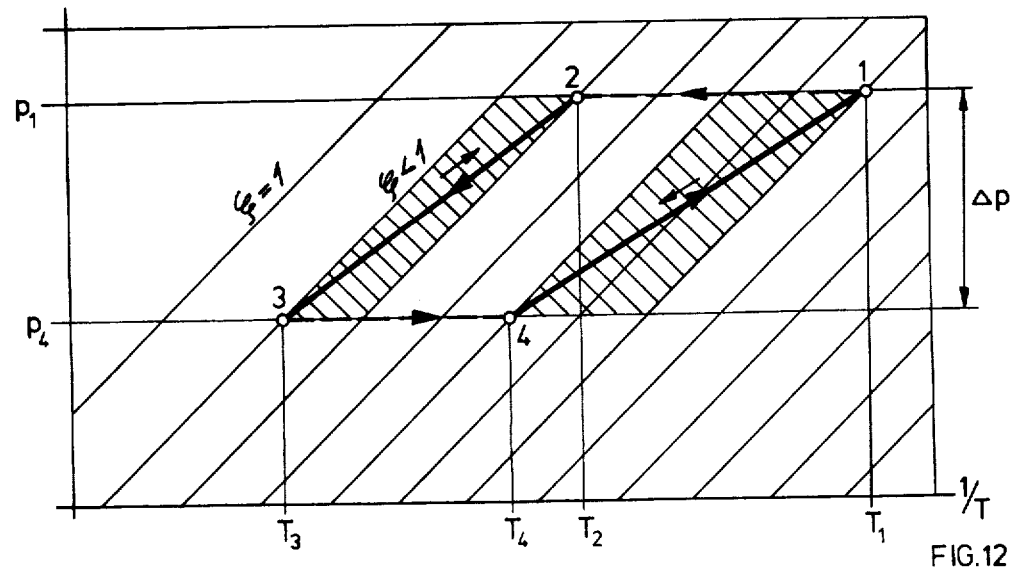
FIG. 12 is an illustration analogous to FIG. 11 for a reabsorption process.

In each of FIGS. 11 and 12 is illustrated the thermodynamic operating process of an absorption heat pump module, in each case by a vapor pressure diagram of a working material pair—for example, the aqueous lithium bromide solution. Upon the X-axis the temperatures are illustrated in terms of 1/T; on the Y-axis the pressures p are plotted on a logarithmic scale. In words, these figures state the following:

The thermodynamic working process of a heat pump module is best explained by reference to a conventional Log P(1/T) diagram for a working material pair, for example the aqueous lithium bromide solution. For pure solution medium (water, cooling medium) $\xi = 1$.

The heavy lines designate the change in condition of the cooling medium fluid as well as the change in condition of the solution and its concentrations. The course of the vapor form cooling medium (water vapor, saturated vapor) is signified by broken lines.

The condition of the heat quantity $Q_1$ to the moist surface 11 of the wall 1 according to FIG. 1 is effected by the solution condition, point 1 of the FIG. 11 diagram. It brings about a vaporization of cooling medium at the temperature $T_1$ and the pressure $p_1$.

The cooling medium vapor flows to the condenser 6 and is condensed at the temperature $T_2$ and the pressure $p_1 = p_2$ at condition point 2, with heat abstraction $Q_2$.

The condensate is brought to the pressure $p_3$ by means of the throttling instrumentality 8 and at $T_3$ is evaporated in the evaporator 7 with addition to it of the heat quantity $Q_3$. This corresponds to condition point 3.

The cooling medium vapor in this condition flows to the absorber surface 12, which is in the condition according to point 4. With the temperature $T_4$ and the pressure $p_4$ the cooling medium vapor is absorbed, with removal of the heat quantity $Q_4$.

The concentration of the solutions on the surfaces 11 and 12, corresponding to points 1 and 4, are variable and tend toward equilibrium through diffusion supported by boundary surface phenomena such as the selective absorbency of $H_2O$ from aqueous solutions in capillary structures.

The concentration reduction between the surfaces 11 and 12, signified in the classical absorption refrigeration technic by degasification width, is produced and maintained by the capillary liquid movement which is superimposed upon the diffusion processes.

The necessary temperature reduction ($T_1-T_4$) is established among other things by the selection of the capillary structure material together with the construction and dimensioning of the partition wall as well as the basic pressure in the system.

The working pressure difference ($p_1-p_4$), which must be supported by the partition wall, is, among other things, determined by the dimensioning of the capillary tubes as well as the selection of the capillary fluid.

The thermodynamic operating process of a reabsorption heat pump module is likewise best explained by reference to the vapor pressure diagram (FIG. 12).

The delivery of heat $Q_1$ to the moist surface 11 is accomplished under the solution condition point 1 and effects a vaporization of the cooling medium at the temperature $T_1$ and the pressure $p_1$. This relates to wet vapor.

The cooling medium vapor now flows into the so-called reabsorption chamber, which corresponds to the absorption chamber 5. It is reabsorbed on the surface corresponding to the surface 12, at the temperature $T_2$ and the pressure $p_1 = p_2$, at condition point 2, with heat withdrawal $Q_2$.

The enriched solution, enriched by water, the cooling medium, is brought to the surface 11 by capillary attraction. At the temperature $T_3$ the cooling medium is again driven out with the input of the heat quantity $Q_3$. This corresponds to condition point 3.

The cooling medium vapor flows to the absorber surface 12, which is in the point 4 condition. With the temperature $T_4$ and the pressure $p_3 = p_4$ the cooling medium vapor is absorbed with removal of the heat quantity $Q_4$.

As can be seen from FIG. 12, the reabsorption as well as the ejection is carried out within a solution field and not, as with condensation, on the vapor pressure curve of the cooling medium.

From FIG. 12 it is also apparent that the reabsorption temperature $T_2$ with equal pressures $p_1 = p_2$ is higher than the condensation temperature $T_2$ of cooling medium condensation (FIG. 11).

The employment of a reabsorption heat pump module also has the advantage of an extended possibility for matching the operating conditions.

The heat pump module according to the invention can be manufactured in large volumes as a complete heat pump of small output. Because of its simple nature, multiple such modules can be assembled building-block fashion into large output units corresponding to the needed total output requirement, in the simplest way and manner. Further, the individual modules or module groups can be connected into multiple-stage absorption refrigeration devices. The idea of multiple stage absorption refrigeration devices was proposed almost 50 years ago by E. Altenkirch but could not succeed in the small capacity range because of the high apparatus cost.

Figure 23:
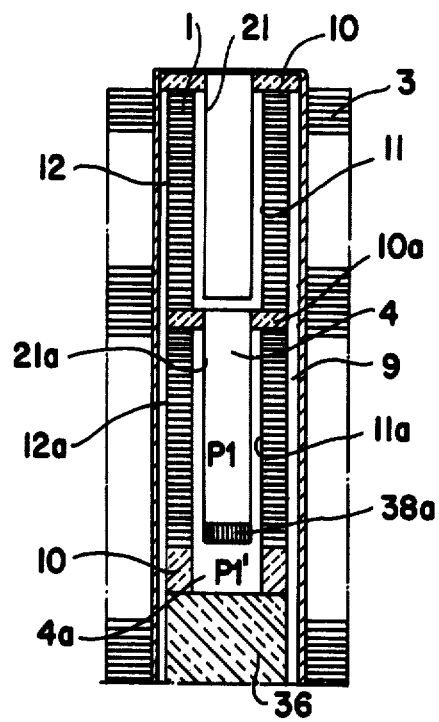
FIG. 23 is a two-step ejector part analogous to FIG. 6.

A further realization possibility for a two or multiple stage absorption refrigeration apparatus is presented in the configuration of FIG. 23, illustrated by way of example as a two-stage heat pump module.

In this the ejector chamber 4 (FIG. 6) is divided into two ejector chambers 4 and 4a that are gas-tightly separated from one another by sealing elements 10a (FIG. 23).

In the ejector chambers 4 and 4a the respective pressures $P_1$ and $p_1'$ prevail, corresponding to their temperatures $T_2$ and $T_2'$.

The cooling medium vaporized off of the surface 11 in the ejector chamber 4 is condensed on the wall 21a. The heat of condensation serves for the second ejection process on the surface 11a.

The resultant condensate is relaxed to the pressure $p_1'$ across the throttle body 38a and is conducted to the evaporator 37 (FIG. 6) through the condenser 36 and the throttle body 38 (FIG. 6) together with the condensate of the cooling medium vaporized off of the surface 11a.

As already described for the single stage embodiment, the vaporized cooling medium then arrives, by way of the connection passage 9 (FIG. 6), at the absorber surfaces 12a and 12 (FIG. 23), where the cold vapor is absorbed with removal of heat and the liquid cooling medium is conducted back to the surfaces 11 and 11a by way of the partition wall, in the already described manner.

With the illustrated embodiment of the heat pump module, it is possible with the ejector output once it is delivered, to achieve almost double the equivalent cooling capacity which the heat condition $Q_3/Q_1$ correspondingly improves.

Figure 24:
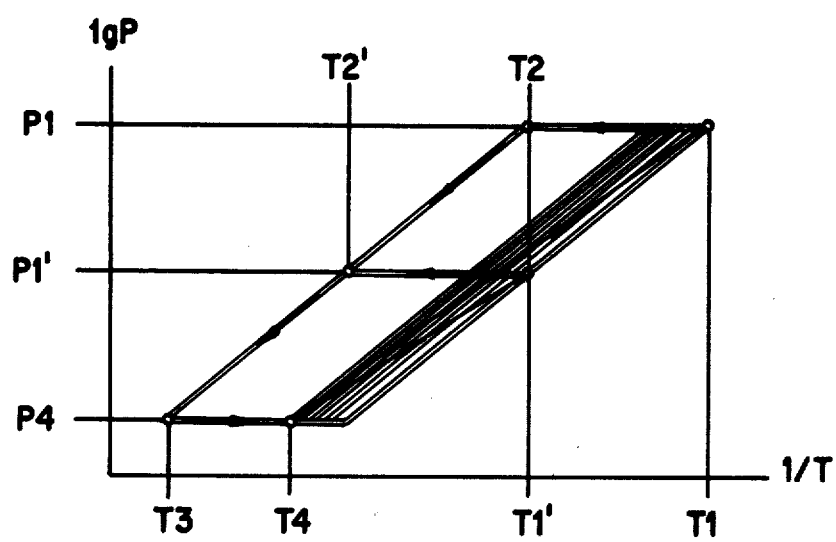
FIG. 24 is a Log P-1/T diagram.

FIG. 24 is a simplified illustration of the thermodynamic operating process of the described two-stage absorption refrigeration apparatus, in a Log P-1/T diagram analogous to the diagram of FIG. 11 and its description.

Figure 13:
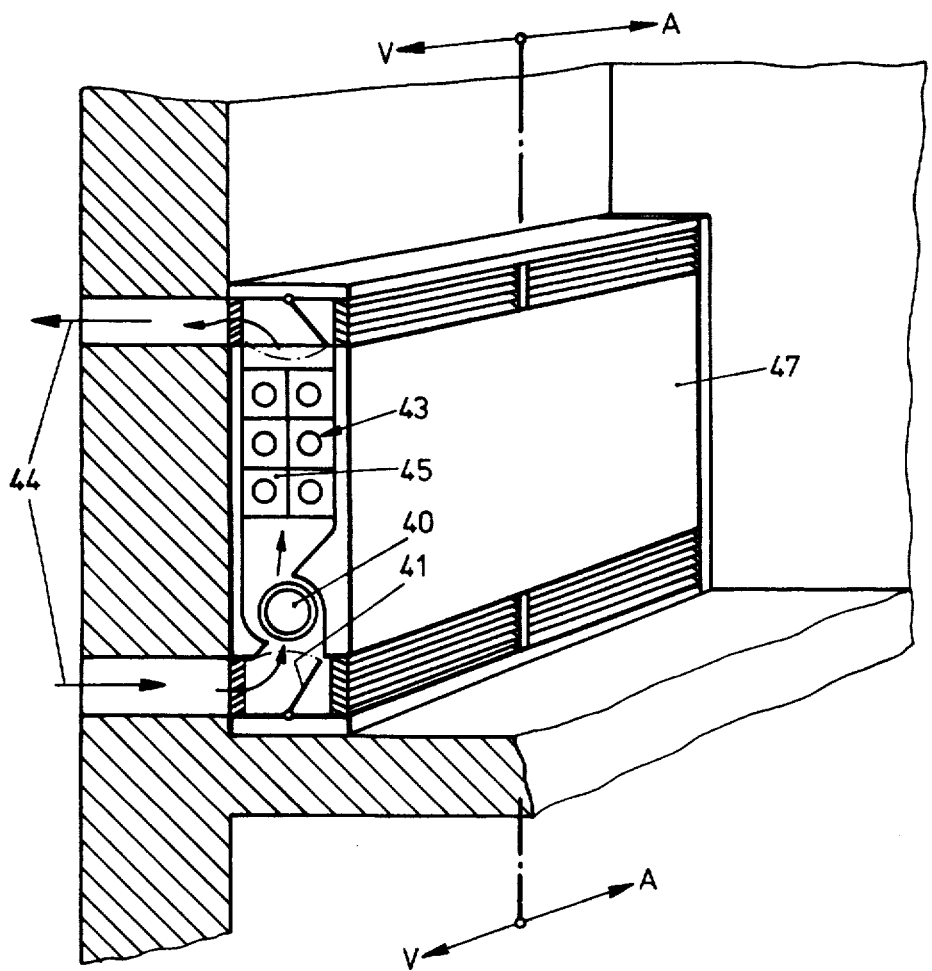
FIGS. 13 and 14 are an example of employment of an absorption heat pump module in a solar climate device, illustrated in schematic perspective (FIG. 13) and (in FIG. 14) in three connections on the evaporation side, on section line V—V, and, analogously illustrated, on the absorber side, on section line A—A, in FIG. 13.
Figure 14A:
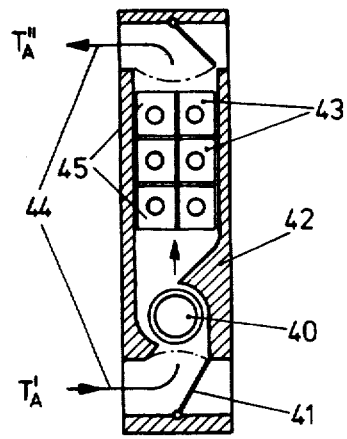
Figure 14B:
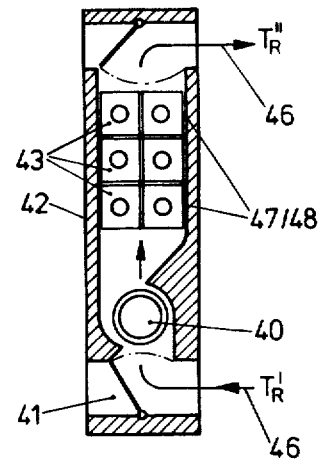
Figure 14C:
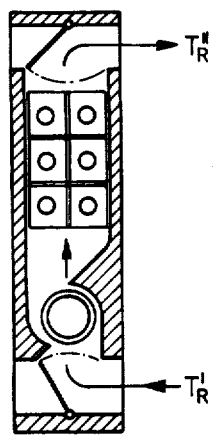
Figure 14D:
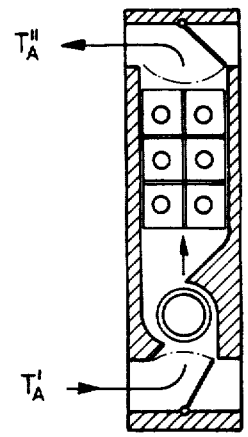
Figure 14E:
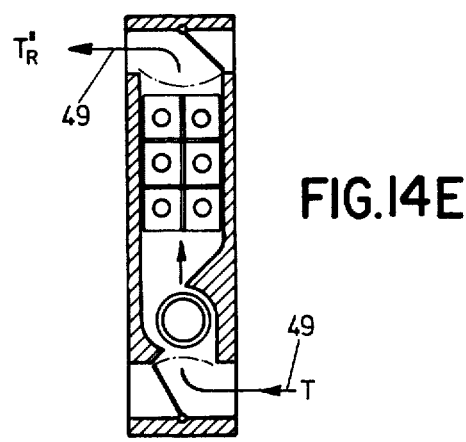
Figure 14F:
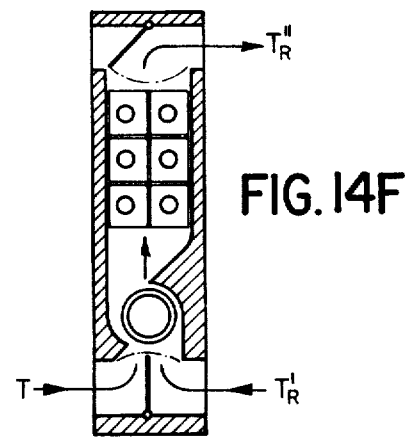

In FIGS. 13 and 14 is illustrated an example of an application of a 300-watt module for a so-called climate apparatus. In this FIG. 13 shows in diagrammatic perspective illustration the basic arrangement of a climate device of that type, while FIG. 14 illustrates sections V—V and A—A through the evaporator side and the absorber side with different positions of the air duct damper, depending upon whether the room side is to be heated with recirculated air and without incoming air, or is to be cooled, or is to be heated with incoming air and recirculated air.

Essentially, this climate apparatus consists of the known structural elements, such as a cross-flow blower 40, air duct damper 41 and a housing 42. In the application according to the invention, in this embodiment, there are employed as heat exchangers six modules 43, each with a heat capacity of 300 watts, as this has been explained above. The necessary ejector heat is conducted to the module 43 in the form of 80-degree water from a solar heat collector (not shown) or a heat pump heating vessel (the first heat pump stage, not shown). The secondary heat at the evaporator 45 is drawn from the outside air 44. The room air 46 heats itself by flowing across the condenser 47 and the absorber 48. With circulation of fresh and recirculated air, the exhaust air 49 is conducted across the evaporator 45 so that its heat is abstracted to the outside temperature (heat recovery). In FIG. 14 the reference characters TR designate room air temperature and TA outside air temperature. The indices ' and " designate inlet and outlet, while fresh air and exhaust air are designated by T.

In cooling operation the room air 46 (TR') is conducted across the evaporator 45 and cooled down to TR". The outside air 44 (TA') flows across the condenser 47 and the absorber 48 and conducts the heat outside (TA"). Solar collector heat can on occasion be used as ejector heat.

FIG. 15 shows an application example of an absorption heat pump module in an absorption heat pump heating vessel. In this, FIG. 15 is a longitudinal section through a heating vessel and FIG. 16 is a section according to section line XVI—XVI of FIG. 15. Absorption heat pump modules 51 are built into this heating vessel. They are equipped with ribbed ejector portions 52 and analogous evaporator portions 53. Absorber and condenser portions, both designated by 54, are washed over by heating water without being provided with ribs. There is further illustrated a gas burner or a methanol burner 55 that burns in a combustion chamber 56. A convector 57 is connected to the combustion chamber, followed by an exhaust gas passage 58. Additionally, fresh air can be led in through a fresh air passage 59 and its heat can be abstracted. Further, a flue gas condensate collector 60 is provided. A blower 61 for exhaust gas or exhaust air drives the gases in an exhaust gas or exhaust air passage 62. At the vessel there is provided a recovery heater connection 63 as well as a preheater connection 64. The vessel water 65 is in a jacketing that is passed by flue gas. The vessel is heat shielded by an insulation 66. In the vessel combustion system there is further illustrated the flame 67 of the burner 55 as well as the exhaust gas path 68 and fresh air 69. Accumulated condensate is led off by way of the outlet 71. A preheater 73 and a recovery heater 72 are likewise illustrated. The function of the vessel is very generally obvious and is clear from FIGS. 15 and 16. Since the flue gases are cooled down to the ambient temperature, there is thus obtained a combustion working efficiency of 100%. This deep cooling down of the flue gases has the advantage that operation can be with low $CO_2$ values, whereby a sure, soot-free combustion can take place with exceptionally low $NO_x$ values. Heat is additionally abstracted from the introduced air or fresh air 69 by means of the evaporator portion 53 and is conducted to the vessel water 65.

Here the absorption heat pump module functions as follows:

The ejector side 52 of the module illustrated in FIG. 15 is acted upon by means of the exhaust gases that flow out of the convector 57 of the heating vessel, so that the exhaust gas temperature at the end of the convector is brought to the necessary working temperature or ejector temperature of the module.

The heat taken up at the end of the ejector portion 52 is conducted to the moist surface 11 (FIG. 1) of the partition wall 1 by an arrangement such as a ribbed heat duct according to FIG. 21. By this, cooling medium vapor is freed and is condensed in the condenser portion 54, upon its surface 52 which, according to FIG. 15, lies in the vessel water. The heat of condensation $Q_2$ is given off to the vessel water. The condensate, as described, is relaxed and is conducted to the evaporator portion 53 (FIG. 15). This evaporator is acted upon from outside by means of the exhaust gas and also by the air 69 drawn in from the environment of the heating vessel. Exhaust gas and room air are thereby cooled to below room temperature. The resulting condensate from the exhaust gases and the environmental air are collected in collector 60 and led off by way of the drain 71. With gas or methanol combustion the condensate can be conducted directly into the passage system. In contrast, with the combustion of fuels that contain sulfur, the condensate must be neutralized.

In the heat pump module the cooling medium vapor flows out of the evaporator into the absorber chamber 5 (FIG. 1) and is there absorbed by the moist surface 12. The heat of absorption $Q_4$ is given off to the vessel water or the heating water by way of the surface of the container 2 (FIG. 1) which, in FIG. 15, again lies in the vessel water.

Thus it is possible, with an application of the absorption heat pump module according to FIG. 15, to make useful the residual enthalpy of the exhaust gas as well as to recover the heat given off from the outer surface of the heating vessel.

Obviously, the construction can also be so chosen that the combustion serves only for the operation of the ejector, and with this secondary heat can be drawn from the surroundings and/or from known secondary heat sources, for example, ground, solar collectors, outside air, etc.

FIG. 17 shows a reabsorption heat pump module in longitudinal section and three cross-sections taken on the lines XVIII—XVIII, XIX—XIX and XX—XX. This basically differs from the absorption heat pump module according to FIG. 1 as the latter has been explained in relation to the description of the diagram FIG. 12.

This module comprises a hygroscopic partition wall 81 which separates the ejector portion from the absorber portion, and which separates the two chambers gastightly from one another by sealingly engaging the inner wall of a receptacle 82. On the exterior of the receptacle 82 are attached fins or ribs 83. Analogously to the embodiment according to FIGS. 6 and 10, the inner wall 84 of the receptacle is led into the interior of the partition wall 81. A seal 85 closes off the ejector portion from outside. Built into the reabsorber portion is a hygroscopic partition wall 86, corresponding to the partition wall 81, which separates the ejector and reabsorber portions from one another. Here, too, the inner receptacle wall 87 is drawn into the reabsorber portion of the receptacle 82. A partition plate 89 with return flow passages in the left hand ejector portion of FIG. 17 leads into the reabsorber portion, while a partition plate 90 is provided that has return flow passages from the reabsorber portion into the ejector portion. A sealing plate 91 covers off the return flow passages 106 and 107 on alternate sides. This comprises a return flow passage system. There are further provided, as section XX—XX shows, radially extending return flow passages 92 as well as return flow longitudinal passages 93 and 94.

In the ejector chamber 96 cooling medium —that is, absorbate—is evaporated off of the surface 95 of the hygroscopic partition wall 81. It flows by way of the passages 92, 93 and 94 into the reabsorption chamber 98, where the cooling medium vapor on the surface 100 of the hygroscopic partition wall 86 is condensed or reabsorbed. Through the pores of the partition wall 85 the thinned capillary fluid (there is less dissolved material in the solution medium) arrives in the evaporator chamber 102 in which the cooling medium is vaporized off of the surface 103 of the partition wall 86 with a low pressure and a low temperature. This cold vapor flows by way of the passages 105, 106 and 107 to the absorber chamber 109 of the ejector portion 97, in which the cold vapor is absorbed on the surface 110 of the hygroscopic partition wall 81.

The absorber/ejector portion 97 of this module works under similar conditions to those of an absorption heat pump module, for example, according to FIG. 1. The difference in the mode of operation of the reabsorption module is simply in that, as the description in relation to FIGS. 11 and 12 explains in detail, in the reabsorber portion (chamber 98) the cooling medium vapor is not condensed by its vapor pressure but instead is reabsorbed with a partial pressure corresponding to the concentration. In consequence, the condenser 6 and the evaporator 7 of the absorption module (FIG. 1) are here replaced by an absorber/ejector (chamber 109 and 96). The advantage of this reabsorption heat pump module is that the condensation or reabsorption takes place with a higher temperature than the condensation of the pure cooling medium, as can be clearly seen from the diagrams FIGS. 11 and 12.

FIG. 21 presents a view of an insertable heat duct 115 for carrying the ejector heat or the evaporator heat. In this figure is seen a conventional heat duct 115 with insert shaft 116 that is provided with ribs 117. The insert shaft 116 is received in an absorption heat pump module ejector 4 or evaporator 37 (FIG. 6). The heat duct 115 takes up heat out of a gas flow by means of the surface, that is, the ribs 117, and conducts it with a small temperature reduction into the shaft 116 of its condensation portion, so that it gives off heat to the inner walls 21, 22 of the heat pump module.

Figure 22:
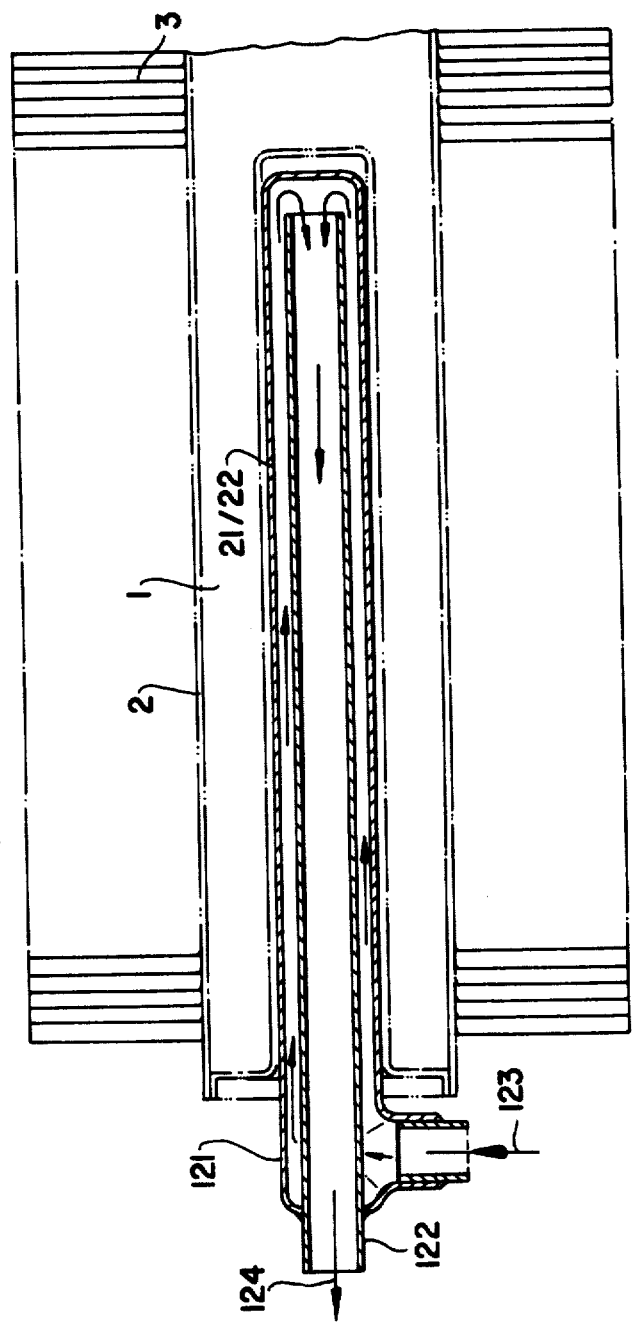
FIG. 22 is a longitudinal section of a heating medium conducting lance.

FIG. 22 shows a heating medium conducting lance with an outer duct 121, an inner duct 122, a heating medium inlet 123 and a heating medium outlet 124. This lance serves for conducting heat to and from a heat pump module of the illustrated type. The lance is insertable and has a good contact with the inner walls 21, 22 of the heat pump module.

Another embodiment of a lance would be a construction in which an outer duct 121 would be omitted. With this type, the inner wall, in the form of the inner duct 122, is directly acted upon by heating medium or cooling medium. Obviously, the lance can be so embodied that the heating or cooling medium is spirally conducted in the concentric annular space by ribs or undulations.

Finally, an example of a heat pump of this type is considered from the standpoint of calculations:

The mode of operation of the operating heat pump vessel can be well clarified by a heat balance calculation.

The module is assumed to operate with a materials pair, for example LiBr-H$_2$O (H$_2$O as cooling medium) with the following temperatures:

Ejection with $T_1 = 135°$ C. $\approx 190$ mm Hg, point 1, FIG. 11

Condensation with $T_2 = 65°$ C. $\approx 190$ mm Hg, point 2, FIG. 11

Evaporation with $T_3 = 10°$ C. $\approx 9$ mm Hg, point 3, FIG. 11

Absorption with $T_4 = 65°$ C. $\approx 9$ mm Hg, point 4, FIG. 11

At the gas side or vessel water side the following temperatures are assumed:
Ejection with $T_1''=140°$ C. exhaust gas, FIG. 15
Condensation with $T_2''=60°$ C. vessel water 65° C., FIG. 15
Evaporation with $T_3''=15°$ C. exhaust gas+incoming air, FIG. 15
Absorption with $T_4''=60°$ C. vessel water 65° C., FIG. 15

The excess temperatures amount to 5° C. at the end, that is, at the outlet of the heat exchanger surfaces, and thereby ensure a suitably large heat flow density.

1. Delivery of heat by means of burner 55, FIG. 15:

$$\dot{Q}_{zu} = \dot{B} \cdot H_u$$

| Fuel throughput | $\dot{B} = 1 \frac{kg}{h} \approx 0.278 \cdot 10^{-3} \frac{kg}{s}$ |
| Lower combustion value | $H_u = 42636 \frac{kJ}{kg}$ |

$$\dot{Q}_{zu} = 11.85 \text{ kW}$$

2. Air delivery through burner 55, FIG. 15

$$\dot{V}_L = 100 \ m_n^3{}^{-1}h \approx 0.028 \ m_n^3 \cdot S^{-1}$$

| Air temperature | $T_L = 20°$ C. |
| Specific heat | $\bar{c}_p = 1.3 \frac{kJ}{m_n^3} \cdot k$ |

3. Combustion and air heating in combustion chamber 56, FIG. 15. The combustion takes place with high excess air ($\lambda=1.7$).

The largest portion of the air does not take part in the combustion; it is warmed by mixing with exhaust gas.

From the enthalpy of the gas mixture the combustion chamber temperature is given:

$$T_F = 344°\ C.$$

4. Heat flow in the combustion chamber and convector 57, FIG. 15:

$$\dot{Q}_F = (T_F - T_1') \cdot c_p \cdot \dot{V}$$

with $T_1' = 300°$ C.

$$\dot{V} = 0.028 \ m_n^3$$

$$c_p = 1.3 \frac{kJ}{m^3} \cdot K$$

becomes $\dot{Q}_F = 1.600$ kW

5. Heat flow at ejector 52, FIG. 15:

$T_1' = 300°$ C.

$T_1'' = 140°$ C.

$\dot{Q}_1 = (T_1' - T_1'') \cdot c_p \cdot \dot{V}$ $\dot{Q}_1 = 5.824$ kW

Special calculations for the ribbed duct with evaporation on the inner side give heat through-flow capacities of $q = 2000$ W/Lfm With this the ejector consists of 2.912 m of ribbed duct or 12 modules of 0.24 m length.

6. Heat flow in passage 8, FIG. 15

$T_1'' = 140°$ C.

$T_3' = 90°$ C.

$\dot{Q}_k = (T_1'' - T_3')c_p \cdot \dot{V}$ $\dot{Q}_k = 1.820$ kW

7. Heat flow in evaporator 53, FIG. 15 (exhaust gas heat)

$T_3' = 90°$ C.

$T_3'' = 15°$ C.

$\dot{Q}_3 = (T_3' - T_3'')c_p \cdot \dot{V}$ $\dot{Q}_3 = 2.730$ kW

8. Heat flow in the evaporator 53, FIG. 15 (supply air heat)

$T_{3L} = 20°$ C.

$T_{3L}' = 15°$ C.

$\dot{V}_L = 0.33 \ m_n^3 \cdot S^{-1}$ $\dot{Q}_{3L} = (T_{3L} - T_{3L}')c_p \cdot \dot{V}$ $\dot{Q}_{3L} = 2.145$ kW The balance of the heat flow in the heat pump—heating vessel according to FIG. 15 is as follows:

| | |
|---|---|
| Heat dilevery through burner 55, FIG. 15 | $\dot{Q}_{zu} = 11.850$ kW |
| Heat flow in combustion chamber 67 directly to the vessel water | $\dot{Q}_F = 1.600$ kW |
| Heat flow at ejector 52 indirectly to the vessel water | $\dot{Q}_1 = 5.824$ kW |
| Heat flow in passage 8 directly to the vessel water | $\dot{Q}_k = 1.820$ kW |
| Heat flow in evaporator 53 out of flue gas heat | $\dot{Q}_3 = 2.730$ kW |
| Heat flow in evaporator 53 out of supply air | $\dot{Q}_{3L} = 2.145$ kW |
| Sum of all heat flows to the vessel water | $\dot{Q}_{Ab} = 14.120$ kW |

$$\text{Efficiency } \eta_F = \frac{\dot{Q}_{Ab}}{\dot{Q}_{zu}} = \frac{14.120}{11.850} = 1.19$$

Related to the primary energy input for production of electrical energy, this efficiency corresponds to the capacity figure of a compressor heat pump $$\epsilon_{aq} = \frac{\eta_F}{\eta_e} = \frac{1.19}{0.35} = 3.40$$

The heat relationship $$\frac{\dot{Q}_3}{\dot{Q}_1} = \frac{4.880}{5.824} = 0.84$$

is altogether realistic and attainable.

With the avoidance of the heat flows $Q_F$ and $Q_k$ in an improved heat pump circuit the efficiency would be $$\eta_F = \frac{10.70}{8.43} = 1.27$$

In a pure heat pump circuit there could be obtained capacity values of $$\eta_{WP} = 1.8 \approx \epsilon_{aq} = 5.14$$

In this description all embodiments embody the essence of the invention.

BEST MODE OF EMBODYING THE INVENTION

The inventor believes that the solution according to FIGS. 6, 10 and 17 is the best.

COMMERCIAL UTILIZATION

The claimed apparatus can find employment, for example, very generally in heating, ventilating and climatizing technology, in the climatizing of vehicles (passenger cars, trucks and buses), heating, ventilating and climatizing in one to two family houses and for household device technology, for example, refrigerators and coolers.

I claim:

1. Heat transfer apparatus comprising an absorption chamber, an ejection chamber, a porous wall separating said chambers, and a heat transfer medium that is capable of exothermic passage from a vapor state to a liquid state and of endothermic passage from the liquid state to the vapor state, and wherein said heat transfer medium flows through said wall from said absorption chamber, in which it is present in the vapor state at one temperature and one pressure, to said ejection chamber, in which it is present at a higher temperature and a higher pressure, said heat transfer apparatus being characterized by:
    A. a liquid diffusion medium which
      (1) is readily soluble in substantially high concentration in said heat transfer medium in the liquid state,
      (2) is hygroscopic to said heat transfer medium, and
      (3) has a boiling point substantially above the range that includes said temperatures and pressures;
    B. the pores of said wall being of a size larger than would attract said heat transfer medium by absorption but small enough to induce capillary flow of said heat transfer medium when it is in the liquid state; and
    C. a liquid solution comprising
      (1) said liquid diffusion medium and
      (2) said heat transfer medium in the liquid state wetting said wall to substantially fill its said pores.

2. The heat transfer apparatus of claim 1, further characterized by:
    D. an elongated vapor-tight housing having a side wall extending from one end to the other thereof,
      (1) said porous wall being in one end portion of said housing and cooperating with said side wall to define one of said chambers,
      (2) the other end portion of said housing comprising an evaporator, and
      (3) the intermediate portion of said housing comprising
         (a) a condenser communicated with the ejector chamber, and
         (b) throttling means through which heat transfer medium passes from said condenser to said evaporator.

3. The heat transfer apparatus of claim 2 wherein said porous wall is of sleeve-like form, further characterized by:
    (1) said porous wall being surrounded by said side wall and in inwardly spaced relation thereto to cooperate therewith in defining said absorption chamber, and
    (2) said housing having a substantially sleeve-like inner wall which is surrounded by said porous wall and is in inwardly spaced relation thereto to cooperate therewith in defining the ejector chamber.

4. The heat transfer apparatus of claim 3, further characterized by:
    (1) a second sleeve-like porous wall spaced along the length of the housing from the first mentioned porous wall and sealed therefrom, said second porous wall being spaced inwardly from said side wall of the housing and cooperating therewith to define a second absorption chamber which is communicated with the first mentioned absorption chamber,
    (2) a sleeve-like partition wall in the housing, surrounded by said second porous wall and cooperating therewith to deine a second ejector chamber which is communicated with said condenser, said sleeve-like partition wall also defining, at its interior, a receiving chamber which is in open communication with the first mentioned ejector chamber, and
    (3) flow restriction means supported by said sleeve-like partition wall and providing for restricted communication between said receiving chamber and said second ejector chamber.

5. The heat transfer apparatus of claim 3, further characterized by:
    said inner wall of the housing being connected with said side wall of the housing by a substantially annular end wall at said one end of the housing and defining a trough-like depression in the housing wherein a liquid heat exchange medium is receivable.

6. The apparatus of claim 2 wherein at least one of said evaporator and said condenser comprises a body of coarse-pored filler material that has good thermal conductivity.

7. The apparatus of claim 2 further characterized by: said throttling means comprising a body of heat insulating porous material.

8. The apparatus of claim 2, further characterized by: duct means extending lengthwise along said side wall of the housing to carry heat transfer medium from said evaporator to the absorption chamber and through the intermediate portion of the housing in sealed-off relation to said condenser and said throttling means.

9. The heat transfer apparatus of claim 1, further characterized by:
   said porous wall having thereon porous projections which extend into the absorption chamber.

10. The heat transfer apparatus of claim 1, further characterized by:
   (1) heat conducting wall means in opposing, spaced relationship to each surface of said porous wall, respectively cooperating with the porous wall in defining said absorption chamber and said ejection chamber; and
   (2) a plurality of heat transfer fins for each said heat conducting wall means, each said fin having one end portion connected in heat transmitting relation to its heat conducting wall means and having its opposite end portion embedded in said porous wall.

11. The apparatus of claim 1, further characterized by:
   a second porous wall in opposing spaced relation to the first mentioned porous wall and cooperating therewith to define said ejector chamber, so that said ejector chamber also serves as a second absorption chamber that is in turn separated from a second ejector chamber by the second porous wall.

12. The apparatus of claim 11, further characterized by:
   spacers of substantially nonewettable material connected with said first mentioned porous wall and said second porous wall to hold them in opposing spaced apart relationship.

* * * * *